United States Patent [19]

Ritsema et al.

[11] 4,436,186

[45] Mar. 13, 1984

[54] DISC BRAKE ASSEMBLY

[75] Inventors: Irving R. Ritsema, South Bend; James J. Colpaert, Granger, both of Ind.

[73] Assignee: The Bendix Corporation, Southfield, Mich.

[21] Appl. No.: 307,918

[22] Filed: Oct. 2, 1981

[51] Int. Cl.³ ............................................. F16D 65/54
[52] U.S. Cl. ............................... 188/71.8; 188/73.44; 188/196 P
[58] Field of Search ............... 188/71.8, 73.44, 73.45, 188/196 P

[56] References Cited

U.S. PATENT DOCUMENTS

| | | | |
|---|---|---|---|
| 3,085,663 | 4/1963 | Jakeways | 188/196 P |
| 3,095,064 | 6/1963 | Tankersley et al. | 188/196 P X |
| 4,334,598 | 6/1982 | Portolese | 188/196 P X |

*Primary Examiner*—Duane A. Reger
*Attorney, Agent, or Firm*—Paul David Schoenle; Ken C. Decker

[57] ABSTRACT

A disc brake includes a caliper assembly (12) cooperating with a pair of friction elements ((14, 16) to brake a rotor (10). A pin assembly (30) supports the caliper assembly (12) and includes a bolt (34) defining an axial spacing for a sleeve (36) which engages the caliper assembly (12) via a resilient bushing (32). The sleeve is permitted to move axially through a clearance (62) with each brake application and a spring (38) biases the sleeve and caliper to always retract through the clearance upon termination of braking.

11 Claims, 3 Drawing Figures

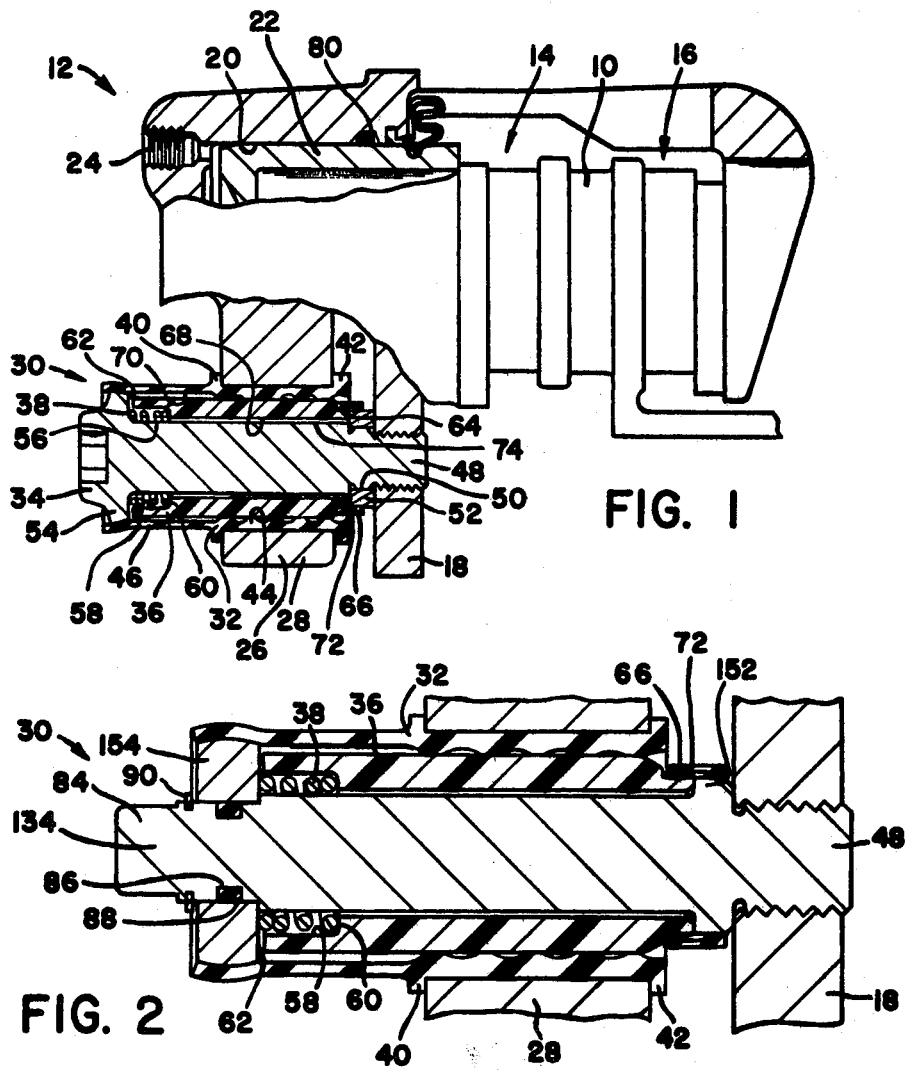
FIG. 1
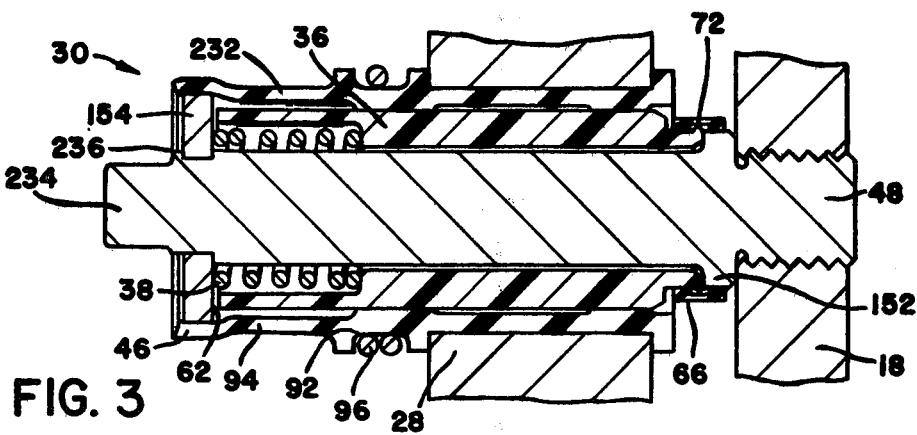
FIG. 2
FIG. 3

DISC BRAKE ASSEMBLY

This invention relates to a disc brake assembly wherein a caliper assembly is carried by at least one pin assembly to permit movement of the caliper assembly relative to a rotor to be braked.

In U.S. Pat. No. 4,200,173 (Evans, et al.) issued Apr. 29, 1980 a pin assembly includes a resilient bushing secured axially to a caliper assembly for movement therewith, a sleeve disposed within an opening formed by the resilient bushing and a pin or bolt secured to a torque member. The caliper assembly, the resilient bushing and the sleeve are movable relative to the bolt during braking; however, upon termination of braking only a retraction seal within the caliper assembly is provided to return the caliper assembly to a rest position so that the outer friction element is maintained in spaced relation to the rotor to substantially reduce drag for the outer friction element.

During a brake application, the caliper assembly is pressurized to directly force the inner friction element into engagement with the rotor and the reaction forces created by this engagement move the caliper assembly on the pin assembly to engage the outer friction element with the rotor. Upon termination of braking, the caliper assembly is depressurized so that a piston within the caliper assembly is retracted to permit the inner friction element to move slightly away from the rotor. This movement is very slight. The rotor rotates substantially within a planar disc; however, slight vibration or deflection occurs to knock back the inner friction element. The inner friction element can retract away from the rotor by overcoming the friction forces of the piston seal and the outer friction element can retract away from the rotor by overcoming the frictional forces of the sliding connection for the caliper assembly. Because the friction forces of the piston seal are believed to be less than for the friction forces of the sliding connection, the outer friction element is believed to generate substantially greater drag for the rotor.

The present invention provides a predetermined or controlled positive retraction for the caliper assembly so that the outer friction element will be moved away slightly from the rotor to be braked. In particular, the present invention provides a disc brake assembly comprising a torque member secured to a nonrotatable portion of a vehicle, a caliper assembly movably disposed relative to the disc by means of at least one pin assembly connecting the caliper assembly to the torque member, a pair of friction elements cooperating with the caliper assembly during braking to engage the disc to retard rotation of the latter, and the pin assembly including a bolt threadably coupled to the torque member, and extending through an opening in the caliper assembly, a resilient bushing engaged to the caliper assembly and extending through the caliper assembly opening, and a sleeve disposed between the resilient bushing and the bolt, characterized by said sleeve cooperating with said bolt to define a predetermined axial clearance therebetween, said predetermined axial clearance providing for said sleeve to move with said caliper assembly and said resilient bushing initially during braking, said resilient bushing moving relative to said sleeve after said predetermined axial clearance is taken up between said sleeve and bolt during braking in order to define an adjusted position for said resilient bushing and caliper assembly relative to said sleeve in response to wear of said friction elements, and said pin assembly further including a resilient member extending between said sleeve and said bolt to bias said sleeve to a position maintaining said predetermined axial clearance between said sleeve and said bolt.

It is an advantage of the present invention that the caliper assembly and outer friction element are positively retracted through a controlled distance upon termination of braking to substantially reduce drag for the outer friction element.

It is a further advantage of the present invention that a retraction spring is compactly arranged within the pin assembly.

FIG. 1 is a side view of a disc brake assembly with a pin assembly for the disc brake assembly shown in cross section;

FIG. 2 is a first alternative construction for the pin assembly of claim 1; and

FIG. 3 is a second alternative construction for the pin assembly of claim 1.

In FIG. 1 the disc brake includes a rotor 10 to be braked and a caliper assembly 12. A pair of friction elements 14 and 16 are carried by a torque member 18 adjacent the rotor 10 in a conventional manner. The friction element 14 is commonly referred to as the inner friction element and the friction element 16 is commonly referred to as the outer friction element. The caliper assembly forms a cylinder 20 for receiving a movable piston 22. A port 24 leads to the cylinder 20 to communicate fluid pressure thereto during braking. The caliper assembly also forms a leg 26 with an axially extending opening 28 for receiving the pin assembly 30.

In accordance with the invention, the pin assembly 30 comprises a resilient bushing 32 secured to caliper leg 26, a bolt 34 threadably secured to the torque member 18, a sleeve 36 slidably engageable with the resilient bushing 32 and a resilient member or coil spring 38 engaging the sleeve 36 and the bolt 34. The resilient bushing 32 includes radially extending ears 40 and 42 engageable with the leg 26 to secure the resilient bushing to the caliper leg 26. A plurality of inwardly extending ribs 44 frictionally engage the sleeve 36 and an axially extending skirt 46 is engageable with the bolt 34. The bolt 34 is provided with a threaded end 48 and a reduced diameter section 50 carries a spacer 52. A radially extending head 54 cooperates with the spacer 52 to define a recess 56 having a predetermined axial length. The recess 56 also receives the sleeve 36 and the coil spring 38 is disposed substantially within an inner recess 58 on the sleeve 36 to abut a shoulder 60 and the head 54. Consequently, in the rest position illustrated in FIG. 1, the coil spring 38 biases the sleeve 36 toward the rotor 10 in abutment with the bolt spacer 52 so as to define a predetermined axial clearance 62 between the bolt 34 and the sleeve 36. The sleeve 36 also forms an outer recess 64 substantially adjacent the torque member 18 and a sealing member 66 is disposed within the outer recess 64 in engagement with the sleeve 36. The sealing member 66 also engages the spacer 52 to prevent contaminates from entering the bore 68 defined by the sleeve 36. The skirt 46 sealingly engages the head 54 to also prevent contaminates from entering the bore 70 defined by the resilient bushing 32.

A sleeve tab 72 within outer recess 64 cooperates with the sealing member 66 so that movement of the sleeve relative to the bolt 34 also moves the sealing member 66 relative to the bolt and spacer. The sleeve bore 68 is larger in diameter than a main body portion of the bolt 34 so that a radial clearance 74 is provided between the bolt 34 and the bore 68. The clearance 74 permits lateral adjustment of the pin assembly 30 within the caliper opening 28 to align the bolt with the torque member opening receiving end 48. During a brake application, fluid pressure is communicated to the cylinder 20 so that the piston 22 moves to the right in FIG. 1 to urge the inner friction element 14 into engagement with the rotor 10. With the friction element 14 engaging the rotor 10, the fluid pressure within cylinder 20 acts against the caliper assembly 12 to move the caliper assembly 12 to the left. Movement of the caliper assembly 12 to the left causes the resilient bushing 32 to move to the left and the tight engagement between the resilient bushing 32 and the sleeve 36 results in the sleeve 36 also moving to the left relative to the bolt 34. Consequently, the coil spring 38 is compressed and the left end of the sleeve is moved into abutment with the bolt head 54 to take up the clearance 62. At the same time that the resilient bushing 32 and the sleeve 36 are moving, the caliper assembly 12 is also moving the outer friction element 16 into engagement with the rotor 10 so that both friction elements tightly engage the rotor to brake the same. When braking is terminated, the fluid pressure within the cylinder 20 is vented out of the port 24 so that the clamping forces between the friction elements are eliminated. With very little pressure remaining in cylinder 20, a retraction seal 80 biases the piston 22 to withdraw into the cylinder to release the inner friction element from its tight engagement with the rotor 10. At the same time, the reaction forces on the caliper assembly are eliminated, so that the spring force of spring 38 biases the sleeve 36, resilient bushing 32 and caliper 12 to move to the right relative to the bolt 34, torque member 18 and rotor 10 to release the outer friction element 16 from its tight engagement with the rotor 10. The sleeve and caliper are moved outwardly only through a predetermined distance equal to the clearance 62 by the action of spring 38.

As long as the friction elements remain substantially the same thickness assuming very little wear, the resilient bushing 32 will remain fixed relative to the sleeve 36 so that they will move in unison. When wear does occur for the friction elements, the friction forces at the interface between the resilient bushing 32 and the sleeve 36 are overcome by the caliper assembly reaction forces so that the resilient bushing 32 is moved to the left on the sleeve 36 during braking and after the sleeve 36 abuts the bolt head 54. During adjustment when the resilient bushing is moving relative to the sleeve and also during braking, the skirt 46 is provided with slight interference fit with the bolt head 54 so that the skirt 46 can easily slide relative to the bolt head 54. Throughout the life of the friction elements, the sleeve 36 and seal 66 will only move relative to the bolt through a distance equal to clearance 62, whereas the resilient bushing 32 will be adjusted continuously relative to the sleeve 36 to accommodate lining wear for the friction elements.

Turning to the first alternative embodiment in FIG. 2, the left end 84 of bolt 134 is provided with a recess 86 carrying a seal 88 and the head 154 is a separate part from the bolt 134. A snap ring 90 retains the head 154 on the bolt 134. Also, the spacer 152 is integrally formed with the bolt 134. As a result, the sleeve 36 in FIG. 2 is assembled to the bolt 134 from the left end.

In the second alternative embodiment of FIG. 3, the resilient bushing 232 is provided with an annular groove 92 substantially adjacent the caliper leg 28 and axially spaced from the portion 94 of skirt 46 which is adapted to slide over the bolt head 154. The head 154 is retained on the bolt 234 by staking the latter at 236. Within the groove 92 is disposed a spring 96, which cooperates with the resilient bushing 232 at the groove 92 to radially contract the resilient bushing into tight engagement with the sleeve 36. This structure provides a higher friction force at the interface between the resilient bushing 232 and the sleeve 36 so that adjustment of the resilient bushing relative to the sleeve will only occur when the friction elements are worn. The spring 96 is also believed to provide a more reliable friction force between the sleeve and resilient bushing opposing movement therebetween.

In conclusion the foregoing description illustrates how a pin assembly for a disc brake can provide a controlled retraction upon termination of braking through a predetermined clearance. Although one pin assembly is illustrated, it is contemplated that where two pin assemblies are provided to slidably support a caliper assembly, each pin assembly could be provided with the controlled retraction structure described above.

We claim:

1. A disc brake assembly comprising a torque member secured to a nonrotatable portion of a vehicle, a caliper assembly movably disposed relative to the disc by means of at least one pin assembly connecting the caliper assembly to the torque member, a pair of friction elements cooperating with the caliper assembly during braking to engage the disc to retard rotation of the latter, and the pin assembly including a bolt threadably coupled to the torque member and extending through an opening in the caliper assembly, a resilient bushing engaged to the caliper assembly and extending through the caliper assembly opening, and a sleeve disposed between the resilient bushing and the bolt, characterized by said sleeve cooperating with said bolt to define a predetermined axial clearance therebetween, said predetermined axial clearance providing for said sleeve to move with said caliper assembly and said resilient bushing initially during braking, said resilient bushing moving relative to said sleeve after said predetermined axial clearance is taken up between said sleeve and bolt during braking in order to define an adjusted position for said resilient bushing and caliper assembly relative to said sleeve in response to wear of said friction elements, and said pin assembly further including a resilient member extending between said sleeve and said bolt to bias said sleeve to a position maintaining said predetermined axial clearance between said sleeve and said bolt.

2. The disc brake assembly of claim 1 in which said bolt includes a radially extending head at one end remote from said threadable coupling with said torque member, said sleeve forms a step with a shoulder facing said radially extending head and said resilient member comprises a coil spring encircling a portion of said bolt and engageable with said shoulder and said radially extending head.

3. The disc brake assembly of claim 1 in which said pin assembly further includes a sealing member engageable with said bolt and said sleeve substantially adjacent said threadable coupling and said sealing member accommodates the relative axial displacement between said sleeve and said bolt to maintain a sealing engagement therewith.

4. The disc brake assembly of claim 3 in which said resilient bushing and said sleeve define a radial clearance adjacent said torque member and said sealing member is capable of being disposed within said radial clearance.

5. The disc brake assembly of claim 1 in which said sleeve further defines a radial clearance with said bolt to permit radial adjustment of said caliper assembly, said resilient bushing and said sleeve relative to said bolt when the latter is threadably coupled to said torque member.

6. The disc brake assembly of claim 1 in which said bolt includes a radially extending head at one end remote from said threadable coupling, said resilient bushing includes an axially extending skirt forming an opening for receiving said pin assembly and said radially extending head forms an interference fit with said skirt so that said skirt is expanded radially to receive said head within said skirt opening, and said skirt further forms a radial clearance with the portion of said bolt separate from said radially extending head in order to receive said sleeve and said resilient member.

7. The disc brake assembly of claim 1 in which said pin assembly includes a sealing member sealingly engaging said sleeve and said bolt substantially adjacent said torque member, said sleeve forming an outer recess at one end and an inner recess at the other end, said outer recess receiving said sealing member and said inner recess receiving said resilient member.

8. The disc brake assembly of claim 1 in which said pin assembly further includes a second resilient member surrounding said resilient bushing to bias the latter tightly into engagement with said sleeve.

9. The disc brake assembly of claim 8 in which said resilient bushing forms an outer groove substantially adjacent said caliper assembly opening and said second resilient member is disposed within said outer groove.

10. The disc brake assembly of claim 1 in which said bolt defines a predetermined axial recess with stop means at each end of said predetermined axial recess, said sleeve being movable axially within said predetermined axial recess and said resilient bushing being movable relative to said sleeve to an adjusted position in response to wear of said pair of friction elements.

11. A pin assembly for carrying a vehicle caliper assembly which is movable during braking to engage at least one friction element with a rotor, said pin assembly comprising:
a bolt secured at one end to a nonrotatable portion of said vehicle adjacent said rotor, said bolt defining an outer recess extending axially from said one end to an opposite end forming a head;
a sleeve disposed within said outer recess and cooperating with said bolt head to define a predetermined axial clearance at one end of said sleeve remote from said rotor; and
a resilient member extending between said sleeve and said bolt head to bias said sleeve away from said bolt head and toward said rotor to a rest position within said outer recess;
said sleeve being movable with said caliper assembly away from said rotor to take up said predetermined axial clearance and load said resilient member during braking and said resilient member cooperating with said caliper assembly via said sleeve upon termination of braking to return said sleeve in the direction of said rotor to its rest position and to return said caliper assembly to its rest position.

* * * * *